Patented Sept. 24, 1946

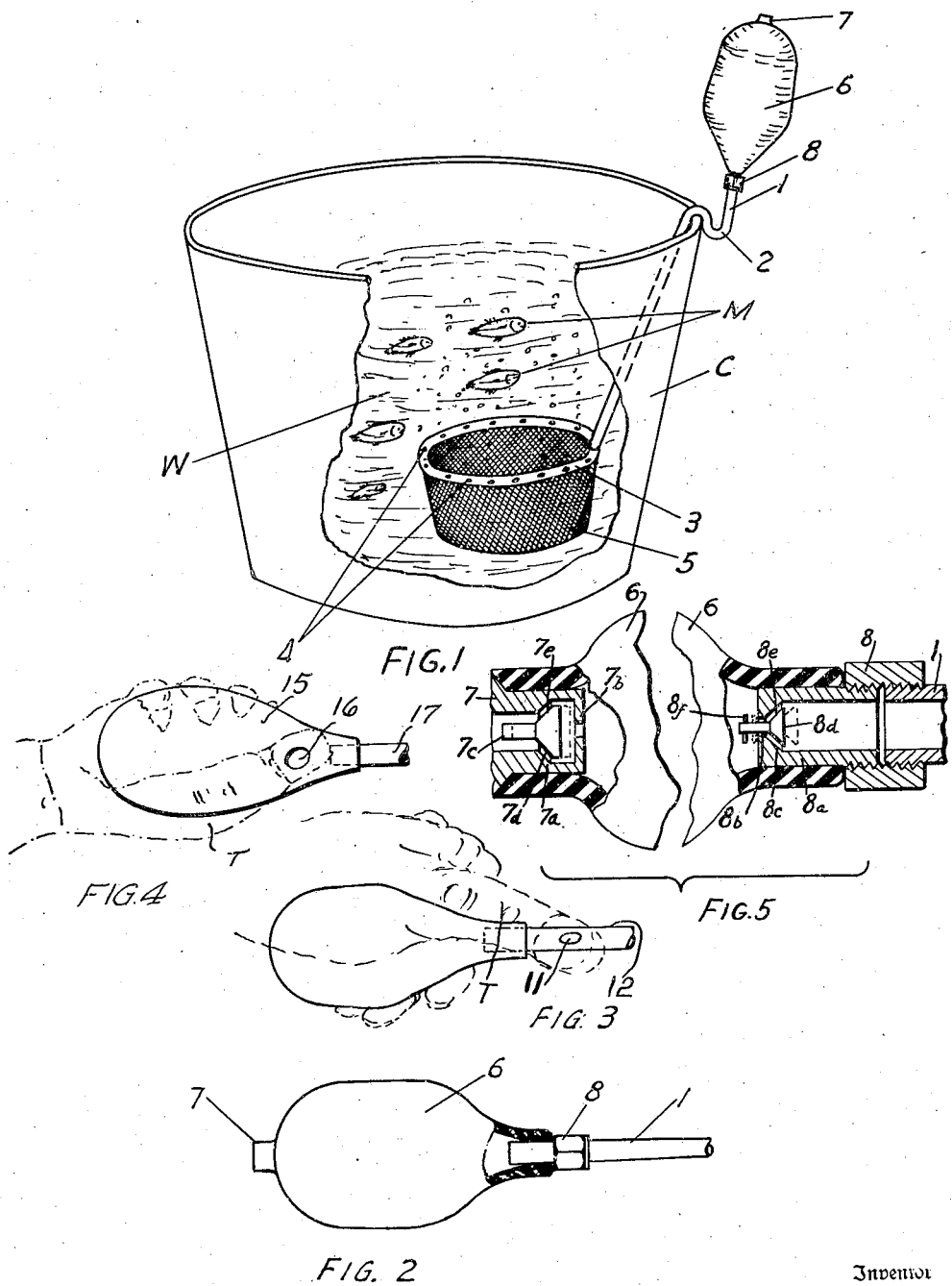

2,408,306

UNITED STATES PATENT OFFICE 2,408,306

AERATOR

Algernon F. Flournoy, Shreveport, La.

Application April 29, 1944, Serial No. 533,368

5 Claims. (Cl. 43—57)

My invention relates to aerators and more especially to a combination aerator and dip net for use in fishing with live bait.

An object of my invention is to provide an aerator for keeping minnows alive in a minnow bucket or other container while in transit to the fishing location and during the time of fishing.

Another object of my invention is to provide an aerator fashioned in the shape of a small dip net frame and provided with a net adapting it to be used as a dip net as well as an aerator.

It is the common experience of those who fish with live bait, minnows, to note that minnows will die in a minnow bucket in a very short time if the water in which the minnows are swimming is not changed frequently or fresh oxygen is otherwise supplied to the minnows. This comes about by the fact that the minnows breathe up all of the oxygen in the water. It often occurs that a fisherman will buy a bucket of live minnows and will lose all or most of the minnows within about an hour's time when traveling to the fishing ground.

Fishermen also know that a change of water will often stun the minnows to such an extent that they make very poor bait. This is especially true where the water environment of the minnows was first cold water and later warm water, say that of the fishing stream or lake.

While it is desirable to keep the minnows over the side of a boat in say the screened inner receptacle of a minnow bucket, there are disadvantages in such a practice. Where this is done the minnow bucket has to be frequently lifted into the boat to rebait the hooks. Another objection to this practice is that the minnow bucket hung over the side of a boat interferes with the maneuvering of the boat in brushy places which fishermen know are ideal fishing places for many types of fish.

In my accompanying drawing I have illustrated a preferred type of minnow aerator that embodies my invention and two other modifications of this aerator.

In the drawing:

Figure 1 is a perspective view of the preferred type of my minnow aerator shown in operating position.

Figure 2 is a fragmentary view of a portion of the minnow aerator illustrated in Figure 1, Figure 3 is a fragmentary view of a modified form of my minnow aerator, Figure 4 is a fragmentary view of another modified form of my minnow aerator.

Figure 5 is an enlarged broken view in part cross-section of portions of the valve structure included in Figure 2.

Referring to Figure 1, C designates a container which is partially filled with water W in which minnows M are shown swimming. My minnow aerator incorporates a tubular handle 1 which is formed into an S bend 2 by means of which my minnow aerator can be hung on the vertical side wall of the container C. The lower end of the tubular handle 1 is formed into a ring 3 provided with perforations 4, the function of which will be explained later. The ring 3 serves as a dip net frame for the mesh 5. My device thus far described constitutes a practical dip net for dipping up minnows.

The bulb 6 attached to the upper end of the tubular handle 1 functions as a convenient handle in the use of my minnow aerator as a dip net. The ring 3 is formed in a plane extending substantially perpendicular to the tubular handle. This feature of arrangement of the ring 3 permits the ring 3 to be placed flat on the bottom of the container C when desired. This feature of arrangement is a decided improvement over prior art dip nets of this kind where the mesh sustaining loops lie in the same plane as the handle of such dip nets for my dip net may be pulled vertically upward with a minimum disturbance of the water to trap unsuspecting minnows. In using the prior art type dip net, minnows must be chased before they can be caught much as a butterfly is chased. In chasing the minnows about in the minnow bucket with the prior art type of dip net, the fisherman cannot help but stir up mud, trash, minnow scales and the like debris settled on the bottom of the minnow bucket to the detriment of the minnows.

While my above description of my minnow aerator thus far is specifically directed to its application as a novel dip net, it is to be understood that my minnow aerator may be fashioned, also, in the shape of prior art dip nets within the scope of my invention.

In the preferred type of minnow aerator illustrated in Figures 1 and 2 of my drawing, a hollow rubber bulb 6 is provided with an outer check valve 7 and an inner check valve 8, arranged to operate to permit air to be drawn into the hollow rubber bulb 6 during an expansion of the hollow rubber bulb 6 through the outer check valve 7 and to be expelled through the inner check valve 8 to thereafter emerge through the perforations 4 of the ring 3 when the bulb 6 is compressed. When the collapsed hollow rubber bulb 6 is allowed to expand, to draw in air through the outer check valve 7, the inner check valve 8 closes to prevent water from being drawn up into the bulb 6.

The outer check valve 7 illustrated in Figure 5 includes a tubular valve body 7a which is provided with a pair of inwardly directed prongs 7b which are adapted to limit the opening movement of its movable valve closing plunger 7c. Since the prongs 7b only partially close the inner opening of the tubular valve body 7a air is permitted to pass through the valve 7 when the valve closing plunger 7c is moved to the dotted line open position. The tubular valve body 7a is provided with a cone shaped valve seat 7d with which the cone shaped seat 7e of the plunger 7c is adapted to fit in an air tight manner when the bulb 6 is compressed to deliver air through the inner check valve 8. The inner check valve 8 is provided with a tubular body portion 8a which is provided with a restricted opening 8b from which arises its cone shaped valve seat 8c. A valve plunger 8d is loosely slidably mounted in the body portion 8a. The valve plunger 8d is provided with a cone shaped valve seat 8e ground to make an air tight fit with the valve seat 8c. When the compressed bulb 6 is allowed to expand the valve plunger 8d moves to closing position. When the bulb 6 is compressed again the valve plunger 8d moves to the dotted line open position. The opening movement of the valve plunger 8d is limited by the stop pin 8f.

The reader should note that I provide my ring 3 with many small perforations 4. I do this purposely to distribute the expelled air in a multiplicity of fine bubbles to facilitate the absorption of the air into the water W.

When a fisherman uses my minnow aerator he simply hangs it on the side of the container C containing the water W and minnows M, or rests the ring 3 on the bottom of the container C. In both cases the bulb 6 will be extended in an upward convenient position to be squeezed. All that he has to do to keep his minnows alive is to frequently squeeze the bulb 6. When the fisherman actually begins fishing he manipulates my minnow aerator as a dip net in the manner above described and during the entire period of fishing he may keep his minnows inside of his boat in a convenient position and continue to supply his minnows with air with my minnow aerator.

In the modified form of minnow aerator partially illustrated in Figure 3, the variation in structure resides in the bulb 10 and the air port 11, preferably formed in the hollow metal tube 12, which tube 12 is otherwise a duplicate of the above described tube 1 carrying the net 5 and provided with perforations 4. The bulb 10 is a hollow rubber bulb provided with an opening into which the end of the tube 12 is forced to make an air tight fit. The air hole 11 is used as the entrance port for the air which is drawn in by the expansion of the bulb 10. When the air is expelled through the tube 12 into the water W the thumb T of the fisherman's hand is placed over the air hole 11 to prevent air from escaping through it.

In the modified form of minnow aerator partially illustrated in Figure 4, the variation in structure resides in the bulb 15 which is provided with an air port 16 in position to be closed by a thumb T and the tube 17 extending from the bulb 15. The tube 17 may extend straight and terminate in a net loop or it may be provided with an S bend such as the S bend 2 formed in the tube 1 as seen in Figure 1. In this modified form of my invention the thumb T of the hand serves as a valve for closing and opening the air port 16 in the same manner as the thumb T functioned as a valve for closing the air port 11 shown in the modified form of the invention illustrated by Figure 3.

Having thus described my invention, I claim:

1. A device of class described comprising a minnow net supporting frame fashioned out of a perforated portion of a hollow tube, a handle member extending from the frame consisting in an extension of a non-perforated portion of said tube, and a collapsible bulb mounted on said handle member, said bulb being adapted to expel air through said minnow net supporting frame.

2. The device as claimed in claim 1, wherein said collapsible bulb is provided with a pair of check valves adapted to regulate the admission of air into said bulb and regulate the expulsion of air from said bulb.

3. The device as claimed in claim 1, wherein said handle member is provided with an air hole positioned and adapted to be closed by a finger of a hand holding said bulb.

4. The device as claimed in claim 1, wherein said bulb is provided with an air hole positioned and adapted to be closed by a finger of a hand holding said bulb.

5. The device as claimed in claim 1, wherein said minnow net supporting frame is fashioned in the form of a ring and is provided with a series of spaced perforations extending lengthwise of the minnow net supporting frame.

ALGERNON F. FLOURNOY.